(12) United States Patent
Pascolini et al.

(10) Patent No.: US 8,989,672 B2
(45) Date of Patent: Mar. 24, 2015

(54) METHODS FOR ADJUSTING RADIO-FREQUENCY CIRCUITRY TO MITIGATE INTERFERENCE EFFECTS

(75) Inventors: Mattia Pascolini, Campbell, CA (US); Matt A. Mow, Los Altos, CA (US); Robert W. Schlub, Cupertino, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1077 days.

(21) Appl. No.: 12/987,055

(22) Filed: Jan. 7, 2011

(65) Prior Publication Data

US 2012/0178386 A1     Jul. 12, 2012

(51) Int. Cl.
*H04B 1/00*     (2006.01)
*H04B 15/00*     (2006.01)

(52) U.S. Cl.
CPC .................................. *H04B 1/525* (2013.01)
USPC ........................................ 455/63.1; 455/67.11

(58) Field of Classification Search
CPC ........ H04B 1/525; H04B 15/02; H04B 15/06; H04B 1/1036; H04B 1/3805; H04B 1/7097; H04B 2001/0416; H04B 2215/064; H04B 2215/065; H04B 7/15571
USPC .............................................. 455/63.1, 67.11
See application file for complete search history.

(56) References Cited

U.S. PATENT DOCUMENTS

| | | | |
|---|---|---|---|
| 6,211,851 B1 | 4/2001 | Lien et al. | |
| 7,725,079 B2 | 5/2010 | Kim et al. | |
| 7,804,920 B2 | 9/2010 | Deisher et al. | |
| 2003/0114188 A1* | 6/2003 | Rousu | 455/553 |
| 2004/0018814 A1 | 1/2004 | Lin et al. | |
| 2004/0121828 A1* | 6/2004 | Wang et al. | 455/575.7 |
| 2005/0215204 A1* | 9/2005 | Wallace et al. | 455/78 |
| 2005/0266902 A1* | 12/2005 | Khatri et al. | 455/575.7 |
| 2006/0109067 A1 | 5/2006 | Shtrom | |
| 2006/0223456 A1* | 10/2006 | Ouzillou | 455/78 |
| 2006/0223577 A1* | 10/2006 | Ouzillou | 455/553.1 |

(Continued)

FOREIGN PATENT DOCUMENTS

| | | |
|---|---|---|
| CN | 101238679 | 8/2008 |
| CN | 101502008 | 8/2009 |

(Continued)

OTHER PUBLICATIONS

Cotterill et al. U.S. Appl. No. 12/959,258, filed Dec. 2, 2010.

(Continued)

*Primary Examiner* — Lewis West
(74) *Attorney, Agent, or Firm* — Treyz Law Group; G. Victor Treyz; Michael H. Lyons

(57) ABSTRACT

An electronic device may transmit and receive wireless signals using wireless circuitry that is controlled by control circuitry. The wireless circuitry may include adjustable components such as adjustable antenna structures, adjustable front end circuitry, and adjustable transceiver circuitry. During characterization operations, the electronic device may be tested to identify operating settings for the wireless circuitry that lead to potential wireless interference between aggressor transmitters and victim receivers. The control circuitry can adjust the wireless circuitry to mitigate the effects of interference based on settings identified during characterization operations or real time signal quality measurements.

8 Claims, 9 Drawing Sheets

(56) References Cited

U.S. PATENT DOCUMENTS

| | | |
|---|---|---|
| 2007/0042725 A1* | 2/2007 | Poilasne et al. ............... 455/101 |
| 2008/0013009 A1 | 1/2008 | Inada |
| 2008/0130725 A1* | 6/2008 | Yu et al. ..................... 375/219 |
| 2008/0146165 A1* | 6/2008 | Young et al. ................. 455/76 |
| 2008/0207114 A1* | 8/2008 | Tuttle ......................... 455/3.01 |
| 2009/0286495 A1* | 11/2009 | Martikkala et al. ......... 455/115.1 |
| 2010/0017816 A1* | 1/2010 | Martini et al. ............... 725/31 |
| 2010/0075595 A1* | 3/2010 | DeMarco et al. ........... 455/11.1 |
| 2010/0112936 A1* | 5/2010 | Friman et al. ............... 455/3.06 |
| 2010/0137025 A1 | 6/2010 | Tal et al. |
| 2010/0194647 A1 | 8/2010 | Man et al. |
| 2010/0222015 A1* | 9/2010 | Shimizu et al. .............. 455/102 |
| 2010/0304685 A1 | 12/2010 | Wietfeldt et al. |
| 2010/0316089 A1 | 12/2010 | Liu et al. |

FOREIGN PATENT DOCUMENTS

| | | |
|---|---|---|
| EP | 2078979 | 7/2009 |
| JP | 2006279649 | 10/2006 |
| KR | 482458 | 8/2005 |
| KR | 2006001331 | 1/2006 |
| WO | 0225853 | 3/2002 |
| WO | 2005104390 | 11/2005 |
| WO | 2007005811 | 1/2007 |
| WO | 2007148143 | 12/2007 |
| WO | 2008066283 | 6/2008 |
| WO | 2008073768 | 6/2008 |

OTHER PUBLICATIONS

Yu et al. U.S. Appl. No. 12/975,284, filed Dec. 21, 2010.

* cited by examiner

| AGGRESSOR | | | | | VICTIM | | | |
|---|---|---|---|---|---|---|---|---|
| PTX | f | DATA RATE | MODU-LATION SCHEME | TUNING MODE | PA | PB | PC | |
| 15 | $f_1$ | 2.0 | T1 | N | VA1 | VB1 | VC1 | ←R2 |
| 15 | $f_1$ | 5.0 | T1 | N | (VA2) | VB2 | VC2 | ←R7 |
| 15 | $f_2$ | 2.0 | T1 | N | VA3 | VB3 | VC3 | ←R4 |
| 15 | $f_2$ | 5.0 | T1 | N | VA4 | (VB4) | VC4 | ←R3 |
| 20 | $f_1$ | 2.0 | T1 | N | VA5 | VB5 | (VC5) | ←R1 |
| 20 | $f_1$ | 5.0 | T1 | N | (VA6) | VB6 | (VC6) | ←R5 |
| 20 | $f_2$ | 2.0 | T1 | N | VA7 | VB7 | VC7 | |
| 20 | $f_2$ | 5.0 | T1 | N | VA8 | VB8 | VC8 | ←R6 |
| 15 | $f_1$ | 2.0 | T2 | N | (VA9) | VB9 | VC9 | |
| 15 | $f_1$ | 5.0 | T2 | N | VA10 | VB10 | VC10 | ←R8 |
| 15 | $f_2$ | 2.0 | T2 | N | (VA11) | VB11 | VC11 | ←R9 |
| 15 | $f_2$ | 2.0 | T2 | S | VA12 | VB12 | VC12 | ←R10 |

FIG. 10

METHODS FOR ADJUSTING RADIO-FREQUENCY CIRCUITRY TO MITIGATE INTERFERENCE EFFECTS

BACKGROUND

This relates generally to communications circuitry, and more particularly, to electronic devices that transmit and receive wireless signals using adjustable wireless circuits.

Electronic devices such as computers and handheld electronic devices are often provided with wireless communications capabilities. For example, electronic devices may use long-range wireless communications circuitry such as cellular telephone circuitry to communicate using cellular telephone bands. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz. Some devices have satellite navigation receivers such as Global Positioning System receivers operating at 1575 MHz.

In electronic devices with capabilities such as these, there is a potential for interference. For example, radio-frequency transmitters may serve as aggressors that produce radio-frequency signals that directly or indirectly interfere with the proper operation of victim radio-frequency receivers. If care is not taken, device operation may be disrupted. For example, interference may cause telephone calls to be dropped or may interrupt a data download.

In view of these considerations, it would be desirable to provide improved wireless circuitry for electronic devices.

SUMMARY

An electronic device may be provided with wireless circuitry that is controlled by control signals from control circuitry. The wireless circuitry may include antenna structures, radio-frequency transceiver circuitry, and front end circuitry that couples the antenna structures to the transceiver circuitry.

The radio-frequency transceiver circuitry includes transmitters and receivers. During simultaneous operation of transmitter and receiver circuitry, a transmitter may serve as an aggressor that has the potential to create undesired wireless interference for a victim receiver. The operation of the electronic device may be characterized under a variety of operating conditions. The results of these characterization operations may be analyzed to determine appropriate settings for adjusting the wireless circuitry in the event that the aggressor transmitter and victim receiver are to be used simultaneously.

During operation, the control circuitry may use one set of operating settings for the wireless circuitry when the aggressor transmitter is active and the victim receiver is not active. These settings may be used to configure the wireless circuitry to optimize wireless performance for the aggressor transmitter. Whenever the control circuitry determines that the aggressor transmitter and victim receiver are to be simultaneously active, a different set of settings may be used to mitigate the effects of interference. These settings may be used, for example, to reduce transmit power for the aggressor transmitter, to adjust the communications band that is being handled by the transceiver, to detune an antenna to reduce interference, to adjust a matching circuit or other front end circuitry, to alter which data rate or modulation scheme is being used, or to make other adjustments. Adjustments may also be made based on real time measurements of signal quality.

Further features of the invention, its nature and various advantages will be more apparent from the accompanying drawings and the following detailed description of the preferred embodiments.

BRIEF DESCRIPTION OF THE DRAWINGS

FIG. 10 is a chart showing how wireless circuit adjustments may be made to avoid interference between aggressors and victims in accordance with an embodiment of the present invention.

DETAILED DESCRIPTION

Figure 1:
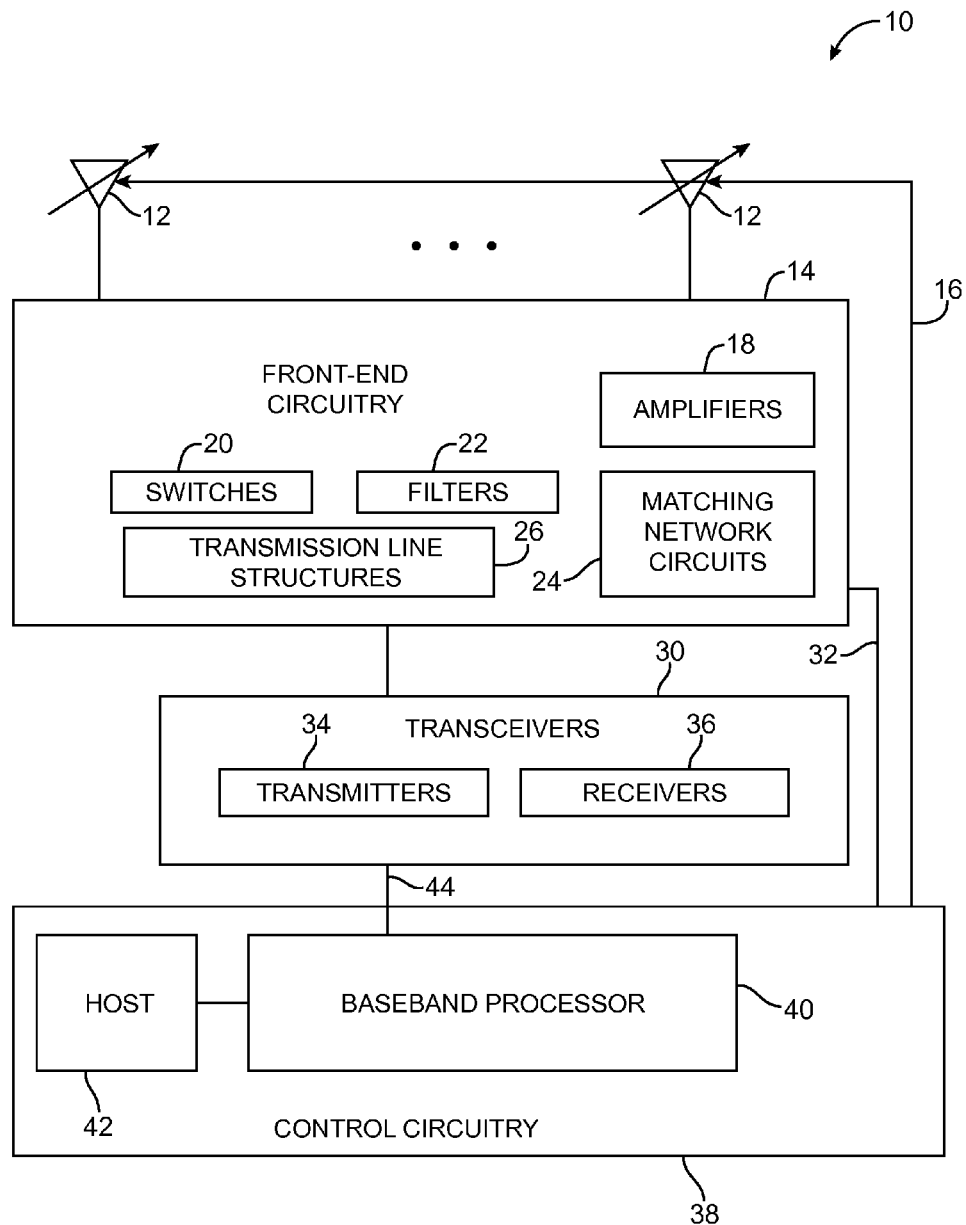
FIG. 1 is a schematic diagram of an illustrative electronic device in accordance with an embodiment of the present invention.

Electronic device 10 of FIG. 1 may be a cellular telephone, a tablet computer, a laptop computer, a handheld electronic device, a wristwatch or pendant device, a music player, or other electronic equipment. As shown in FIG. 1, electronic device 10 may be provided with control circuitry 38 and wireless communications circuitry. Control circuitry 38 may include microprocessor circuitry, memory, application-specific integrated circuits, and other circuitry. In a typical scenario, control circuitry 38 may include a processor such as host 42 (e.g., a processor based on a microprocessor integrated circuit and associated memory) and a baseband processor such as baseband processor 40.

Baseband processor 40 may receive digital data to be transmitted from host 42 and may supply corresponding signals to wireless circuitry such as transceiver circuitry 30 over path 44 for wireless transmission. During signal reception operations, transceiver circuitry 30 may receive radio-frequency signals from external sources (e.g., wireless base stations). Baseband processor 40 may convert signals received from transceiver circuitry 30 over path 44 into corresponding digital data for host 42. The functions of baseband processor 40 may be provided by one or more integrated circuits.

Transceiver circuitry 30 may include one or more radio-frequency transmitters 34 and one or more radio-frequency receivers 36. Transceiver circuitry 30 may be used to support wireless communications such as long-range wireless communications (e.g., communications in cellular telephone bands) and short-range communications (i.e., local area network links such as WiFi® links, Bluetooth® links, etc.). Transceiver circuitry 30 may also include satellite navigation receiver circuitry such as a Global Positioning System receiver operating at 1575 MHz and other wireless circuits.

The wireless communications circuitry of device 10 may include one or more antennas 12. Circuitry such as front end circuitry 14 (sometimes referred to as matching network circuitry or front end module circuitry) may be used to couple transceiver circuitry 30 and antennas 12.

Front end circuitry 14 may include amplifiers 18 such as power amplifiers for amplifying transmitted radio-frequency signals and low noise amplifiers for amplifying received radio-frequency signals.

Transmission line structures 26 may be used to form radio-frequency signal paths between transceiver circuitry 30 and other front end circuitry 14. For example, received radio-frequency signals from the output of a low-noise amplifier may be routed to the input of a receiver using a transmission line. As another example, a transmission line may be used to convey radio-frequency signals from the output of a transmitter to the input of a power amplifier. Transmission line structures may also be used in routing signals from the output of a power amplifier to other circuitry in front end circuitry 14. Transmission line structures 26 may include coaxial cables, microstrip transmission lines, stripline transmission lines, edge-coupled microstrip and stripline transmission lines, etc.

Matching network circuits 24 may be used to help impedance match transmission lines and other radio-frequency components to antennas 12. For example, a network of resistors, inductors, and/or capacitors may be used to help match the impedance of a given one of antennas 12 to the 50 Ohm impedance of a transmission line in structures 26.

Filters 22 may be used to route signals according to their frequency. Filters 22 may include, for example, low pass filters, high pass filters, band pass filters, notch filters (band-blocking filters), diplexers, duplexers, triplexers, and other filters. Examples of components that may be used in implementing filters 22 include surface acoustic wave (SAW) and bulk acoustic wave (BAW) radio-frequency filtering devices.

Switches 20 may be used to control the flow of signals through front end circuitry 14. Switches 20 may include, for example, transistor-based switches, diode-based switches, microelectromechanical systems (MEMS) switches, etc.

Antennas 12 may be based on antenna structures such as inverted-F antenna structures, planar inverted-F antenna structures, loop antennas, dipoles, monopoles, open and closed slot antennas, hybrid designs that include more than one antenna structure of these types, or other suitable antenna structures. There may be one or more antenna 12 in device 10. In a configuration with only one antenna 12, the antenna may be used for transmitting and receiving all radio-frequency signals for the device. In a configuration with multiple antennas 12, one antenna may be active at any time (e.g., when implementing an antenna diversity scheme in which an optimal antenna is selected for use based on real-time performance data) or multiple antennas may be used (e.g., when implementing a multiple-input-multiple-output (MIMO) antenna scheme in which multiple antennas are used in receiving multiple simultaneous streams of data).

Cellular telephone signals (e.g., signals in bands such as the 850 MHz band, 900 MHz band, 1800 MHz band, 1800 MHz band, and 2100 MHz band) may be handled using one or more cellular telephone antennas. Satellite navigation signals (e.g., Global Positioning System signals at 1575 MHz) may be handled using a cellular telephone antenna or using a dedicated antenna. One or more local area network antennas may be used to handle WiFi® (802.11) signals at 2.4 GHz and/or 5 GHz. If desired, a WiFi antenna may be shared between a WiFi® transceiver and a Bluetooth® transceiver operating at 2.4 GHz. Combinations of these arrangements may also be used (e.g., using antennas that are shared between different combinations of transceivers, using one or more different dedicated antennas that are used by only one type of transceiver, etc.).

Transmitted radio-frequency signals from transmitters 34 in transceiver circuitry 30 may be transmitted through front end circuitry 14 and through one or more antennas 12. Radio-frequency signals from external sources that have been received by one or more of antennas 12 may be conveyed to receivers 36 via front end circuitry 14.

During operation of device 10, it may be necessary to operate device 10 in a configuration that gives rise to the potential for radio-frequency signal interference. The source of the interference (sometimes referred to herein as the aggressor) may be one of transmitters 34. The component that is adversely affected by the interference (sometimes referred to herein as the victim) may be one or receivers 36. Interference may arise, for example, because it is necessary to operate in multiple bands simultaneously. A user may desire, for example, to download a web page using a WiFi® band at 2.4 GHz while simultaneously conducting a cellular telephone call over one of the cellular telephone bands. Particularly when multiple transceiver circuits are active in device 10, it is possible that the actions of an aggressor will disrupt the operation of a victim.

The adverse effects of interference may be avoided by designing the wireless circuitry of an electronic device so that the device will function satisfactorily even under worst-case scenarios. If, for example, there is a possibility for a cellular telephone transmitter in a device to cause interference with a wireless local area network receiver, the wireless circuitry of the device can be designed so as to provide sufficient isolation between the cellular telephone transmitter and wireless local area network receiver. As an example, a device can include antennas that are located at relatively remote locations within the housing for the device, can include filter circuitry for rejecting out-of-band signals, and can operate circuits such as amplifiers at relatively high bias voltages to ensure that they operate linearly and therefore do not generate undesirable out-of-band frequency components.

This type of solution may be satisfactory in many circumstances, but poses challenges. For example, ensuring that antennas 12 are located at relatively large distances from each other in a compact device housing can be difficult or impossible in practice. The inclusion of excessive filtering circuitry can create undesirable frequency losses. Ensuring linear operation of amplifiers and other components can be costly and can consume undesirably large amounts of power. These design tradeoffs may therefore not always be acceptable, particularly when attempting to construct a compact device with good power consumption, low cost, and high performance.

With one suitable arrangement, which is sometimes described herein as an example, the circuitry of device 10 is reconfigured depending on the operating mode of the device. If device 10 is operating in a mode in which an aggressor and victim are simultaneously active, the control circuitry of device 10 can adjust the wireless circuitry of device 10 to mitigate the effects of interference. These adjustments can be made in proactively (i.e., using an open-loop control scheme in which adjustments are made based on predetermined optimized settings). Interference-mitigating circuit adjustments may also be made in real time based on measured signals or other feedback (i.e., using closed-loop control).

The adjustments that are made to reduce interference may result in performance tradeoffs. For example, a reduction in interference may result in a temporary increase in power consumption or a temporary decrease in signal quality. If device 10 is operating in a mode in which there is little or no risk of undesirable interference, device 10 can be returned to its original configuration so as to remove these performance tradeoffs and optimize performance. For example, if device 10 is operating in a mode in which the aggressor transmitter is active and the victim receiver circuitry is inactive, the control circuitry of device 10 can configure the wireless circuitry of device 10 to optimize performance of the aggressor transmitter without regard to whether interference is created.

Examples of adjustments that may be made to device 10 include antenna adjustments, adjustments to the circuitry of front end circuitry 14, and adjustments to transceiver circuitry 30. Antennas 12 may, for example, be adjusted using control signals from control circuitry 38 that are conveyed to antennas 12 via paths such as path 16. Adjustments to front end circuitry 14 may be made using control signals from control circuitry 38 that are conveyed to front end circuitry 14 over path 32. Path 44 may be used to convey control signals from control circuitry 38 to transceiver circuitry 30.

Figure 2:
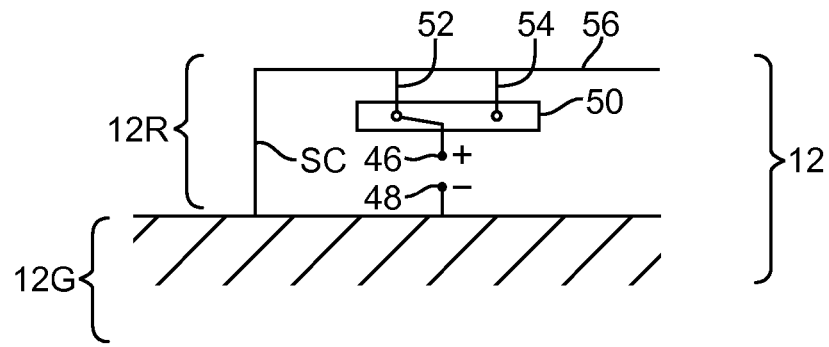
FIG. 2 is a schematic diagram of an illustrative antenna with an adjustable feed in accordance with an embodiment of the present invention.

Antenna structures 12 may be tuned using adjustable circuitry such as switches and adjustable circuit components. With one suitable arrangement, which is shown in FIG. 2, the frequency response of antenna 12 may be tuned by adjusting the position of the antenna feed. Antenna 12 of FIG. 2 is an inverted-F antenna having a resonating element (antenna resonating element 12R) and a ground (antenna ground 12G). Other types of antennas may also be provided with tunable feeds. The use of an inverted-F antenna with a tunable feed in the antenna of FIG. 2 is merely illustrative.

As shown in FIG. 2, antenna resonating element 12R may have a main arm 56 that is coupled to ground via branch SC. Antenna 12 may be fed using an antenna feed having a positive terminal (positive antenna feed terminal 46) and a ground terminal (ground antenna feed terminal 48). Transceiver circuits 30 may be coupled to the antenna feed made up of antenna feed terminals 46 and 48 (e.g., using a matching circuit, transmission line, and other front end circuitry). Switch 50 may have two positions (as an example). The position of switch 50 may be controlled by control signals from path 16. When placed in a first mode of operation, switch 50 will couple terminal 46 to path 52. When placed in a second mode of operation, switch 50 will couple terminal 46 to path 54. With this arrangement, the location of the antenna feed along the length of arm 56 and therefore the frequency response of antenna 14 may be adjusted by configuration of switch 50.

Figure 3:
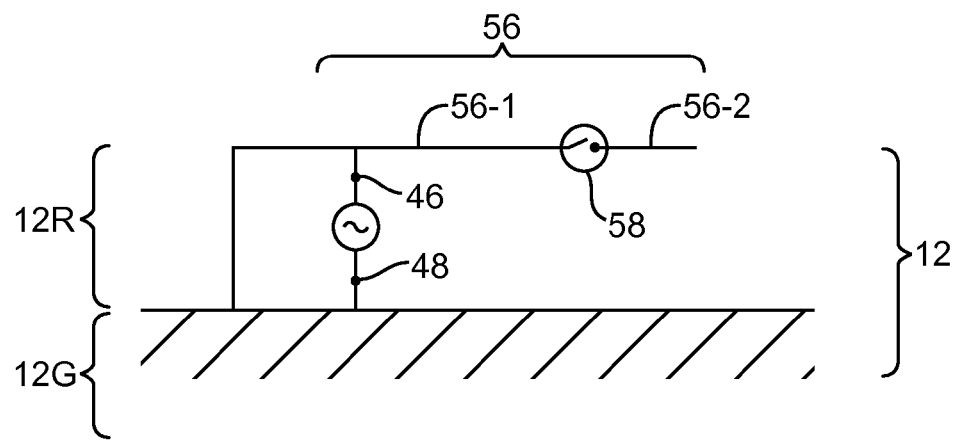
FIG. 3 is circuit diagram of an illustrative antenna with an adjustable antenna resonating element in accordance with an embodiment of the present invention.

FIG. 3 shows another illustrative tunable antenna. Antenna 12 of FIG. 3 has a switch such as switch 58 with open and closed positions. The state of switch 58 may be adjusted in response to control signals on path 16 (FIG. 1). When switch 58 is open, arm segment 56-2 of antenna resonating element arm 56 will be electrically isolated from arm segment 56-1. When switch 58 is closed, arm segments 56-1 and 56-2 will be electrically shorted together. By adjusting switch 58, control circuitry 38 can adjust the effective length of arm 56 and therefore the frequency response of antenna 12.

Figure 4:
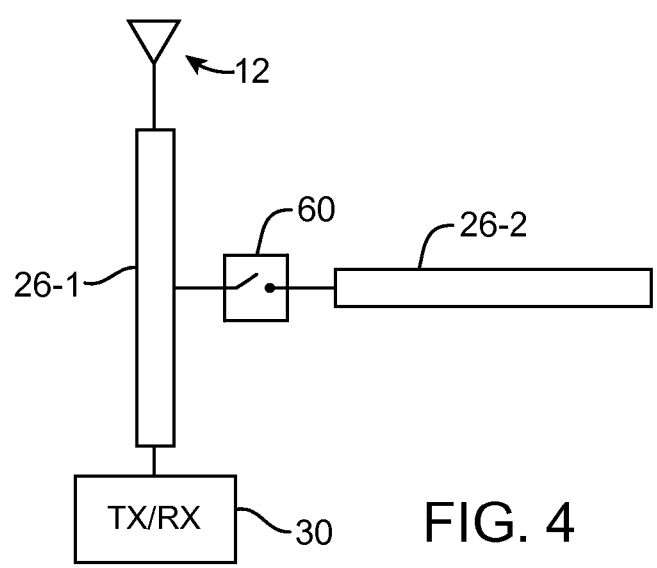
FIG. 4 is a circuit diagram of an illustrative adjustable transmission line circuit in accordance with an embodiment of the present invention.

In the configuration of FIG. 14, antenna 14 is coupled to transceiver circuit 30 by transmission line segment 26-1. Switch 60 may have open and closed positions and may be controlled by control signals from control circuitry 38 that are provided to switch 60 over a path such as path 32 of FIG. 1. When open, switch 60 can electrically isolate transmission line segment 26-1 from transmission line segment 26-2. When closed, switch 60 can connect transmission line segment 26-2 to a desired location along the length of transmission line segment 26-1. In this configuration, transmission line segment 26-2 may serve as a tuning stub that adjusts the frequency response of the circuitry shown in FIG. 4.

Figure 5:
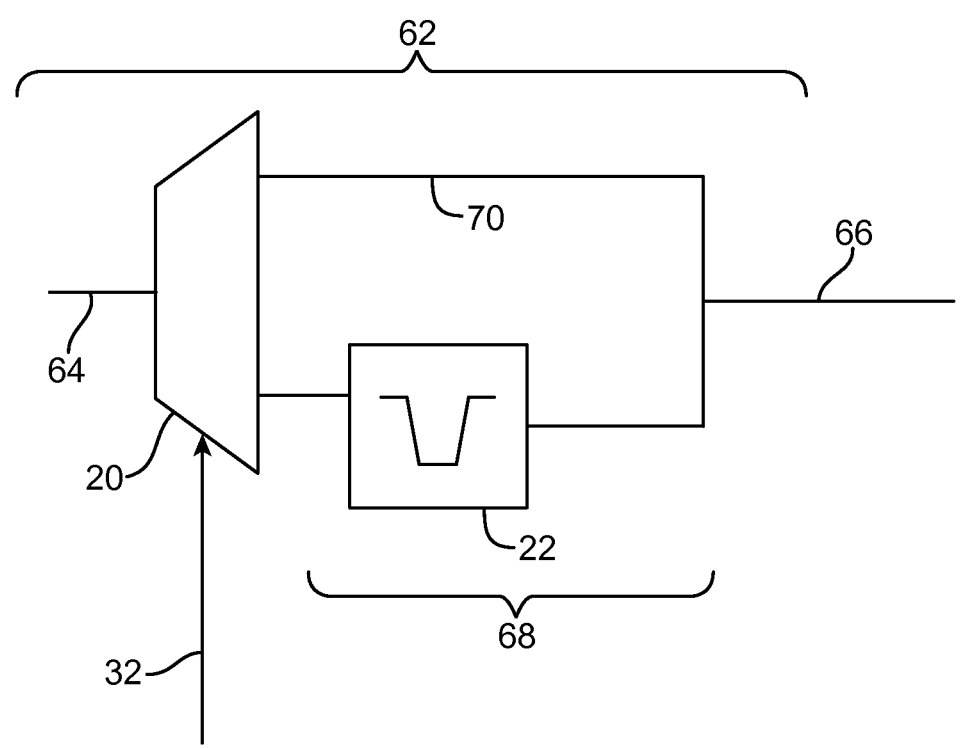
FIG. 5 is a circuit diagram of an illustrative circuit that may be used to selectively block signals using a filter such as a notch filter in accordance with an embodiment of the present invention.

Another way in which the wireless circuitry of device 10 may be adjusted to mitigate the effects of interference involves the use of switches and filter circuitry. An example of an adjustable circuit that includes a switch and a notch filter is shown in FIG. 5. As shown in FIG. 5, circuit 62 may be coupled between path 64 and path 66. Paths such as paths 64 and 66 may be connected to transmission line structures 26, antennas 12, the inputs and outputs of amplifiers 18, parts of matching circuits 24, or other suitable front end circuitry 14.

Switch 20 may have two positions (as an example). The position in which switch 20 operates may be selected by providing switch 20 with control signals on path 32. In its first position, switch 20 may connect path 70 to path 64. In this configuration, signals can pass between paths 64 and 66 without interruption and without experiencing attenuation from filter 22. In its second position, switch 20 may connect path 68 to path 64. In this configuration, notch filter 22 is switched into use.

Notch filter 22 may block signals that fall within a particular frequency band and may allow signals outside of the frequency band to pass. When notch filter 22 is switched into use between path 64 and path 66, signals with frequencies within the notch filter band will be attenuated, whereas signals outside of this band will not be significantly affected (other than by the relatively small reduction in power due to the insertion loss of filter 22). Filter 22 can be used whenever it is desired to reduce signal interference. For example, switch 20 can be used to switch filter 22 into use to block interference signals that fall within the blocking range of filter 22. When it is not necessary to block interference signals with filter 22, signals can be routed along path 70, thereby bypassing filter 22 and avoiding the insertion loss of filter 22.

Figure 6:
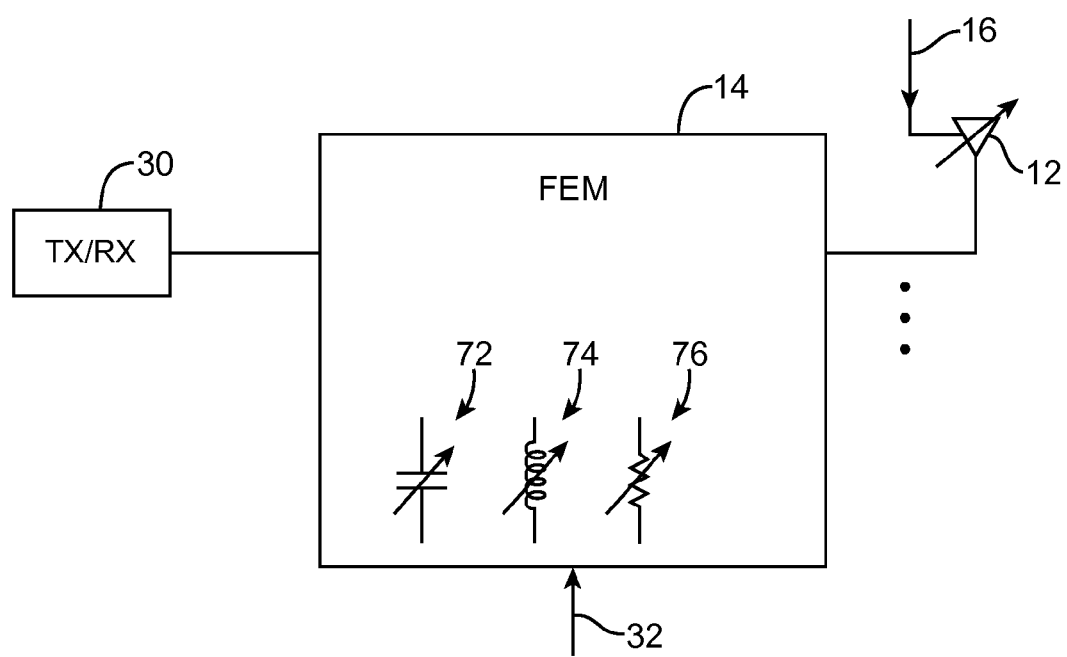
FIG. 6 is a diagram of illustrative front end circuitry showing how the front end circuitry may contain tunable components in accordance with an embodiment of the present invention.

As shown in FIG. 6, front end circuitry 14 may include tunable components such as tunable capacitor 72, tunable inductor 74, and tunable resistor 76. Components such as tunable capacitor 72, tunable inductor 74, and tunable resistor 76 may be interconnected to form a tunable matching network. Adjustable components such as switches 20, filters 22, amplifiers 18, and/or transmission line structures 26 may be connected to components such as tunable capacitor 72, tunable inductor 74, and tunable resistor 76 within front end circuitry 14. During operation, control signals on paths such as paths 32 and 16 may make adjustments to the components of circuitry 14 and/or antenna 12 to help reduce radio-frequency interference (e.g., by adjusting the frequency response of the matching circuitry and thereby adjusting the frequency characteristics of the wireless circuitry).

Figure 7:
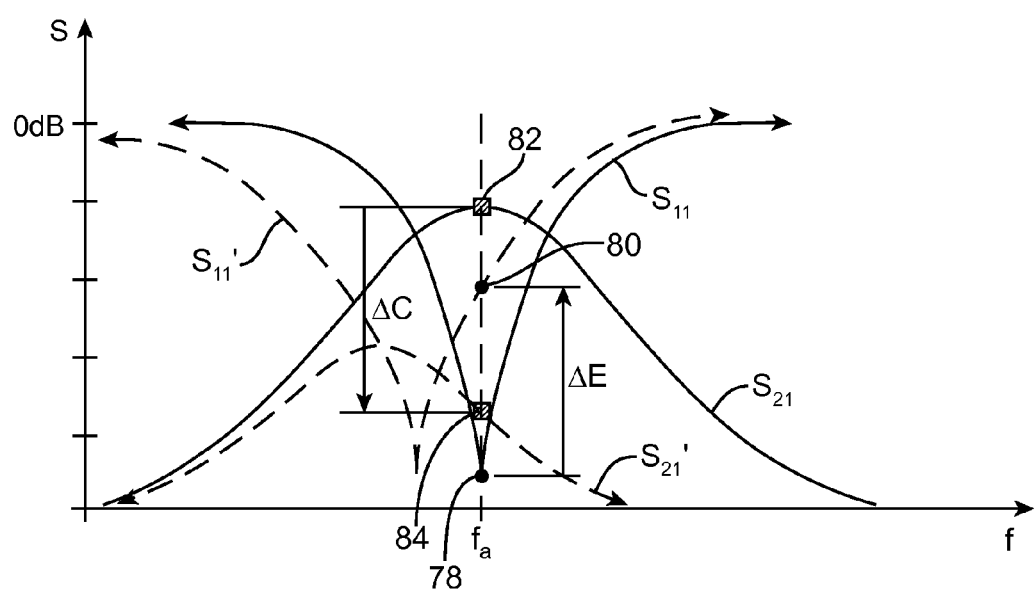
FIG. 7 is a graph illustrating how adjustments to wireless circuitry in an electronic device may be made to mitigate the effects of interference in accordance with an embodiment of the present invention.

A graph showing how wireless circuit adjustments may reduce signal interference is shown in FIG. 7. In the example of FIG. 7, antenna performance parameters (S parameters) are plotted as a function of operating frequency f. The example of FIG. 7 corresponds to antenna structures with a frequency response that may be tuned using a tunable feed, a tunable antenna resonating element arm, or other antenna tuning techniques. In general, interference may be adjusted using any suitable adjustments to circuitry 14 and/or antenna 12. The tunable antenna arrangement described in connection with FIG. 7 is merely illustrative.

Curve S11 of FIG. 7 (which represents return loss of an aggressor that is transmitting signals through an antenna in device 10) corresponds to the frequency response of the antenna structures when operated in a first mode (i.e., a mode that maximizes performance for the aggressor). As shown by the valley and relatively low value of curve S11 at point 84 (i.e., at frequency fa), the antenna structures have a peak efficiency for transmitting (and receiving) signals when operating at frequencies around fa. When adjusted to operate in a second mode, the frequency response of the antenna structures shift to lower frequencies, as shown by curve S11'. The efficiency of the antenna structures in transmitting and receiving radio-frequency signals at frequency fa is therefore adversely affected, as illustrated by the elevated value of curve S11' at point 80. The magnitude of the loss of efficiency is depicted as change ΔE in the graph of FIG. 7 (i.e., the distance between points 78 and 80).

Although antenna performance is reduced by ΔE when the antenna is detuned, the amount by which the antenna structures are exposed to potential signal interference may be reduced significantly. In the example of FIG. 7, signal interference is represented by curves S21 and S21'. These curves illustrate the amount of transmitted signal power from an aggressor that is coupled through the antenna structures to a victim receiver.

Curve S21 corresponds to the amount of signal interference as a function of frequency f when the antenna structures are operated in the first mode. Curve S21' corresponds to the amount of signal interference that is present when the antenna structures are detuned and are operating in the second mode. In its first mode, the amount of potential signal interference at operating frequency fa (i.e., in the center of the communication band that is being handled by the antenna structures), is represented by point 82. When the antenna structures are adjusted and are operating in the second mode, the amount of signal interference at the victim is reduced, as represented by the value of curve S21' at point 84. The reduction in interference when adjusting the antenna structures from the first operating mode to its second operating mode corresponds to the difference between points 82 and 84 in FIG. 7 (i.e., ΔC). By proper configuration of antennas 12 and front end circuitry 14, the advantages from the reduction in interference (ΔC) for the victim that is produced by adjusting (detuning) an antenna can more than offset the disadvantages associated with the temporary reduction in efficiency ΔE for that is experienced by the aggressor.

The potential of wireless circuitry in device 10 to cause interference of the type shown in FIG. 7 can be characterized over a variety of operating parameters. Optimized settings for adjusting antenna structures 12 and front end circuitry 14 may then be identified. In situations in which only one transmitter is active or when it is otherwise not expected that interference will degrade wireless performance in device 10, the front end circuitry and antennas of device 10 may be placed in their most efficient states (i.e., to maximize transceiver efficiency, as illustrated by curve S11 of FIG. 7). If, however, device 10 is operated in a mode in which interference is expected to degrade victim performance (i.e., a mode in which both an aggressor transmitter and victim receiver are simultaneously active), the antenna structures and/or front end circuitry may be adjusted (e.g., detuned) to mitigate the effects of the interference.

In some configurations, interference may result from the presence of nonlinearities in the components of front end circuitry 14 (e.g., in switches, amplifiers, etc.). To reduce or eliminate interference of this type, front end circuitry 14 may be adjusted so as to interpose a notch filter (e.g., notch filter 22 of FIG. 5) within an appropriate circuit path.

Figure 8:
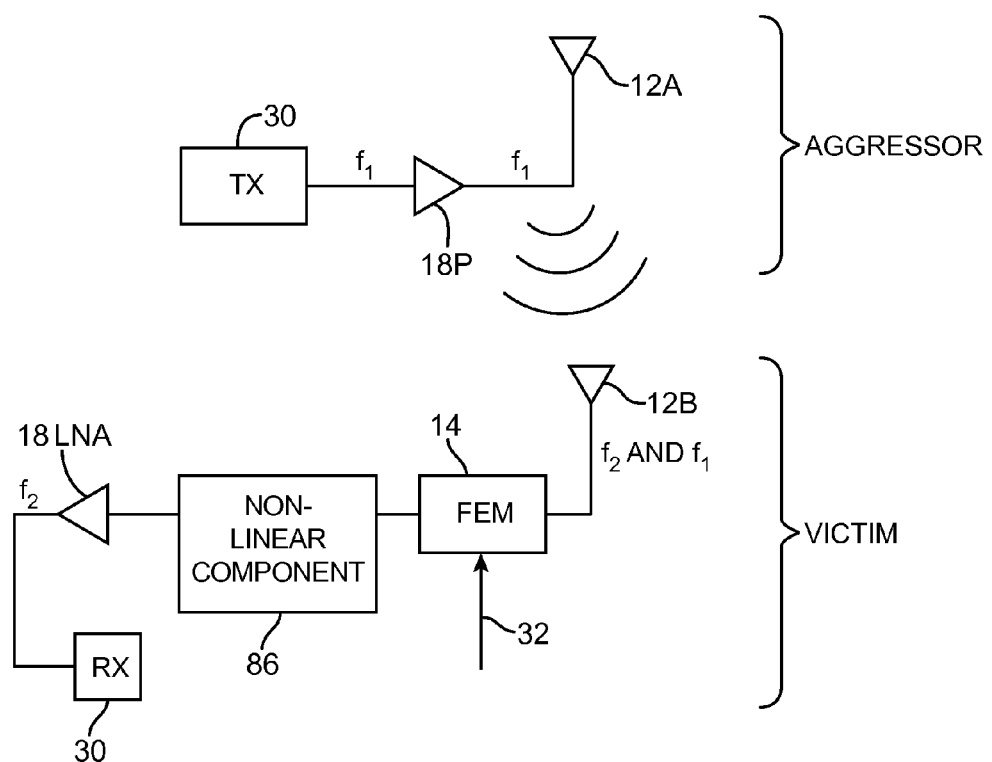
FIG. 8 is a diagram showing how an aggressor such as a wireless transmitter has the potential to cause interference with a victim such as a wireless receiver due to potential nonlinearities in a component located between an antenna and the receiver in accordance with an embodiment of the present invention.

Consider, as an example, the situation shown in FIG. 8. In the scenario of FIG. 8, transceiver circuitry 30 includes an aggressor (transmitter TX) and a victim (receiver RX). Aggressor TX transmits signals at frequency f1. These signals are amplified by power amplifier 18P and are transmitted wirelessly through antenna 12A. Victim RX operates at a different frequency band (i.e., at frequency f2). Victim RX receives signals using antenna 12B, front end circuitry 14, non-linear component 86 (i.e., a switch or other component that is nominally linear, but that exhibits unavoidable nonlinearities in practice), and low noise amplifier 18LNA. Frequency f2 (in this example) is equal to twice frequency f1.

Because of a close proximity between antennas 12A and 12B or other factors, some of the transmitted signals from antenna 12A at frequency f1 are received by antenna 12B and pass through circuitry 14 to component 86. Due to its nonlinear behavior, component 86 may produce second harmonics at a frequency of 2f1 (in this example). Because of the relationship in frequencies between f1 and f2 (i.e., because f2 is twice f1), the harmonic signals at frequency 2f1 that are produced in component 86 fall within the receive band of victim RX at frequency f2 and therefore represent interference.

To reduce the impact of the interference at 2f1 on the operation of victim RX, front end module 14 can be adjusted to insert a notch filter the blocks signals at frequency f1 whenever aggressor TX and victim RX are simultaneously operating. A notch filter arrangement of the type shown in FIG. 5 may be used. When victim RX is active and aggressor TX is inactive, switch 20 may be used to route signals past the notch filter to avoid the insertion loss penalty associated with the notch filter. When aggressor TX is operating, switch 20 may be used to switch the notch filter into use to prevent signals at frequency f1 from reaching component 86. Because the signals at frequency f1 do not reach component 86, victim receiver RX can properly receive signals from external sources at frequency f2 without interference.

Figure 9:
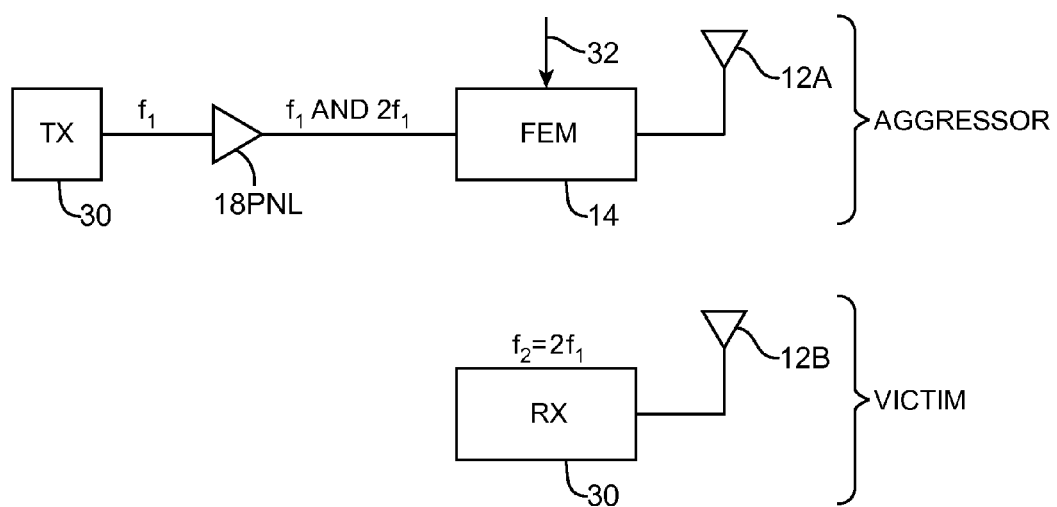
FIG. 9 is a diagram showing how an aggressor such as a wireless transmitter has the potential to cause interference with a victim such as a wireless receiver due to potential nonlinearities in a component located between the transmitter and an antenna in accordance with an embodiment of the present invention.

Another illustrative scenario in which selective filtering may be used to block undesired interference is illustrated in FIG. 9. In the example of FIG. 9, transceiver circuitry 30 includes an aggressor (transmitter TX) that is transmitting radio-frequency signals in a communications band centered at frequency f1 and a victim (receiver RX) that is receiving radio-frequency signals at frequency f2 (i.e., a frequency f2 that is equal to 2f1 in this example). Aggressor TX is transmitting wireless signals through power amplifier 18PNL, front end circuitry 14, and antenna 12A. Victim RX is receiving wireless signals through antenna 12B. The behavior of amplifier 18PNL is not ideal and therefore exhibits some nonlinearity. As a result, when signals at frequency f1 pass through amplifier 18PNL, some second harmonics of this frequency (i.e., signals at a frequency of 2f1) are generated at the output of amplifier 18PNL.

The signals at frequency 2f1 that are produced by amplifier 18PNL have the potential to be transmitted by antenna 12A and to be received by antenna 12B. When victim RX is attempting to receive data signals at frequency f2, the signals at frequency 2f1 from the aggressor serve as a source of potential interference.

To mitigate the effects of the interference produced by signals at 2f1 at the output of amplifier 18PNL, adjustable circuitry such as circuitry 62 of FIG. 5 may be incorporated into front end circuitry 14 in the path of the transmitted signals. When there is no risk interference (i.e., when device 10 is operated in a mode in which aggressor TX is active and victim RX is inactive), circuitry 62 can be adjusted to connect path 64 to path 66 through path 70. This bypasses the insertion loss associated with notch filter 22 and ensures that signals from transmitter TX can be transmitted with maximum efficiency. When a risk of performance degradation is present because aggressor TX and victim RX are both active, circuitry 62 can be configured to route signals through path 68. Notch filter 22 (e.g., a notch filter with a blocking band centered about frequency 2f1) in path 68 can then filter out signals with frequencies near 2f1. Because signals at 2f1 are blocked by notch filter 22, only signals at frequency f1 are transmitted through antenna 12A. This reduces or eliminates interference at frequency 2f1 at antenna 12B and victim RX.

In the examples of FIGS. 8 and 9, interference was produced when a signal passed through a nonlinear component and generated a second harmonic. This is merely illustrative. Interference (e.g., intermodulation distortion, etc.) can be produced due to the non-ideal behavior of any wireless components (e.g., transmitters, amplifiers, switches, filters, etc.) and may result from the interaction of one or more signals in one or more of these components. The examples of FIGS. 8 and 9 in which signal interference is produced by an undesired second harmonic of a fundamental frequency f1 is just an example.

To avoid undesired interference, the behavior of device 10 can be characterized by testing. During tests, one or more representative versions of device 10 may be placed in a radio-frequency test chamber. Tests may be performed in which various functions of the device are exercised. Examples of operations that may be performed when testing device 10 include making and receiving cellular telephone calls, uploading and downloading data using WiFi® and Bluetooth® bands, receiving satellite navigation signals, and using other wireless circuit functions. The test may be performed over a variety of communications bands so as to identify potentially undesirable combinations of aggressors and victims in device 10. After identifying potential operating conditions that lead to undesired interference, suitable remedial actions can be identified.

Examples of remedial actions that can be taken to mitigate the effects of interference include: adjusting the wireless circuitry of device 10 (e.g., by tuning antenna structures 12 and/or adjusting front end circuitry 14), adjusting a transmit data rate, adjusting a transmit power level, adjusting the frequency at which signals are being transmitted, and adjusting the modulation scheme that is used in transmitting signals.

FIG. 10 is a table that illustrates the types of actions that may be taken in device 10 to mitigate the effects of interference. In the example of FIG. 10, an aggressor transmits radio-frequency signals at a transmit power level PTX, in a communications band centered at frequency f, at a given data rate, using a given modulation scheme, and using a selected tuning mode for antenna structures and front end circuitry. These parameters may be adjusted to mitigate interference when aggressors and victims are simultaneously active. When aggressors and victims are not both active, operating parameters may be used to maximize performance of the active wireless circuitry.

There are three victims in the FIG. 10 example (PA, PB, and PC). The performance of each victim is represented by the performance metric values VA1 . . . , VB1 . . . , and VC1 . . . , in the columns at the right-hand side of the FIG. 10 table. The performance metric values may each include one or more parameters that are indicative of wireless performance (e.g., bit error rate, frame error rate, signal-to-noise ratio, adjacent channel leakage, etc.). The values of these parameters may be characterized during testing or, if desired, one or more of these values may be measured in real time using control circuitry 38 (e.g., using baseband processor 40). In general, there may be more than one aggressor and fewer or more than three victims. The example of FIG. 10 is merely illustrative.

In the table of FIG. 10, configurations that have been identified as being associated with undesired interference are labeled with circles. For example, the circle around value VC5 in row R1 of the FIG. 10 table indicates that the aggressor is generating interference that is adversely affecting the performance of victim PC. The other circled performance metric values in FIG. 10 correspond to other interference scenarios. The lines in FIG. 10 such as lines 88, 90, 92, 94, and 96 illustrate the types of adjustments that may be made in device 10 to mitigate the effects of interference when device 10 is operated in a mode where aggressors and victims are simultaneously active.

As illustrated by line 88, for example, one way in which to mitigate the effects of interference involves adjusting the power of transmitter 34 (i.e., reducing the maximum allowable output power when both the aggressor and victim are active). If operated with the settings of row R1 (which may be appropriate in the absence of simultaneous operation of aggressor and victim circuits), transmitter 34 would transmit radio-frequency signals at a power of up to 20 (e.g., 20 dBm). As shown in row R1, this can cause an unacceptably high amount of interference with victim PC if both the aggressor and victim PC are active. Accordingly, if is desired to operate the aggressor and victim PC simultaneously, device 10 can adjust the maximum transmit power setting of the aggressor from 20 (as shown in row R1) to 15 (as shown in row R2), as indicated by line 88. If only the aggressor is being used, performance may be enhanced for the aggressor by using the settings of row R1.

The adjustment associated with line 90 relates to changing the data rate of transmitted signals (e.g., from a high data rate to a lower data rate that results in less interference). If operated with the settings of row R3 (as may be appropriate in the absence of simultaneous operation of aggressor and victim circuits), transmitter 34 would transmit data at a data rate of 5 and would create an unacceptably high amount of interference for victim PB. By using the settings of row R4 instead of row R3 when both the aggressor and victim PB are simultaneously active (e.g., to lower the data rate to 2), undesired interference with victim PB may be avoided.

The adjustment associated with line 92 relates to selecting an appropriate frequency f for transmitting signals. If operated with the settings of row R5 (which may be appropriate in the absence of simultaneous operation of aggressor and victim circuits), transmitter 34 would be transmitting signals in a communications band centered at frequency f1 and would create an unacceptably high amount of interference for victims PA and PB. By using the settings of row R6 instead of row R5 when both the aggressor and victim PA are active or when both the aggressor and victim PC are active (e.g., by transmitting signals in a communications band centered on frequency f2 instead of frequency f1), undesired interference with victims PA and PC may be avoided.

The adjustment associated with line 94 relates to selecting an appropriate modulation scheme for the radio-frequency signals handled by transceiver circuitry 30. Examples of modulation schemes that may be used by transceiver circuitry 30 include Gaussian Minimum Shift Keying (GMSK), 8 Phase Shift Keying (8PSK), Binary Phase Shift Keying (BPSK), Quadrature Phase Shift Keying (QPSK), 16 Quadrature Amplitude Modulation (16-QAM), 64-QAM, etc. If operated with the settings of row R7 (which may be appropriate in the absence of simultaneous operation of aggressor and victim circuits), transmitter 34 would transmit data using modulation scheme T1 and would create an unacceptably high amount of interference for victim PA. By using the settings of row R8 instead of row R7 when both the aggressor and victim PA are active (e.g., by operating the aggressor with modulation scheme T2 instead of modulation scheme T1), undesired interference with victim PA may be avoided.

The adjustment associated with line 96 relates to selecting an appropriate tuning for antenna structures 12 and/or front end circuitry 14. If operated with the settings of row R9 (e.g., settings that can be used in the absence of simultaneous operation of aggressor and victim circuits), signals would be transmitted and received using tuning settings N for antennas 12 and front end circuitry 14. Settings N may include, for example, settings related to the position of switches such as switch 50 in FIG. 2, switch 58 of FIG. 3, switch 60 of FIG. 5, switch 20 of FIG. 5, other settings that tune antennas, and the settings for components such as components 72, 74, and 76 of FIG. 6 and other settings that adjust matching circuits and other front end circuitry 14 (as an example). If operated with the settings of row R9, the aggressor would create an unacceptably high amount of interference for victim PA. By using the settings of row R10 when the aggressor and victim PA are simultaneously active instead of row R9 (e.g., to adjust antennas 12 and/or front end circuitry 14), undesired interference between the aggressor and victim PA may be avoided.

The examples of FIG. 10 are merely illustrative. Other adjustments may be made as a function of whether or not aggressors and victims are simultaneously active if desired. For example, rather than changing the communications band in which an aggressor is transmitting signals, the band that is used by a victim in receiving signals may be changed when both aggressor and victim are active or both the aggressor and victim can change to different communications bands to accommodate a need for simultaneous operation. Tuning changes to antennas and/or front end circuits in device 10 may involve changes of the type shown in FIG. 8 in which circuitry associated with a victim is tuned, changes of the type shown in FIG. 9 in which circuitry associated with an aggressor is tuned, or changes to both of these types of circuits. Changes to antennas 12 of the type described in connection with FIGS. 2, 3, 4, and 6 may be made for one or more aggressor antennas, one or more victim antennas, and/or one or more antennas being used by both aggressors and victims. Adjustments to device 10 to mitigate the effects of interference may be made protectively (e.g., by avoiding undesirable settings that test results have revealed will lead to unacceptable interference and using optimal alternative settings in their place whenever aggressors and victims are used simultaneously) and/or may be made based on real time feedback on wireless performance (e.g., data on wireless performance metrics measured using control circuitry 38). The settings for device 10 that enhance wireless performance whenever there is an absence of simultaneous aggressor and victim operation may also be used proactively (i.e., whenever simultaneous operation is not present) or may be used in response to real time measurements (i.e., when measurements indicate that interference is not significant).

Figure 11:
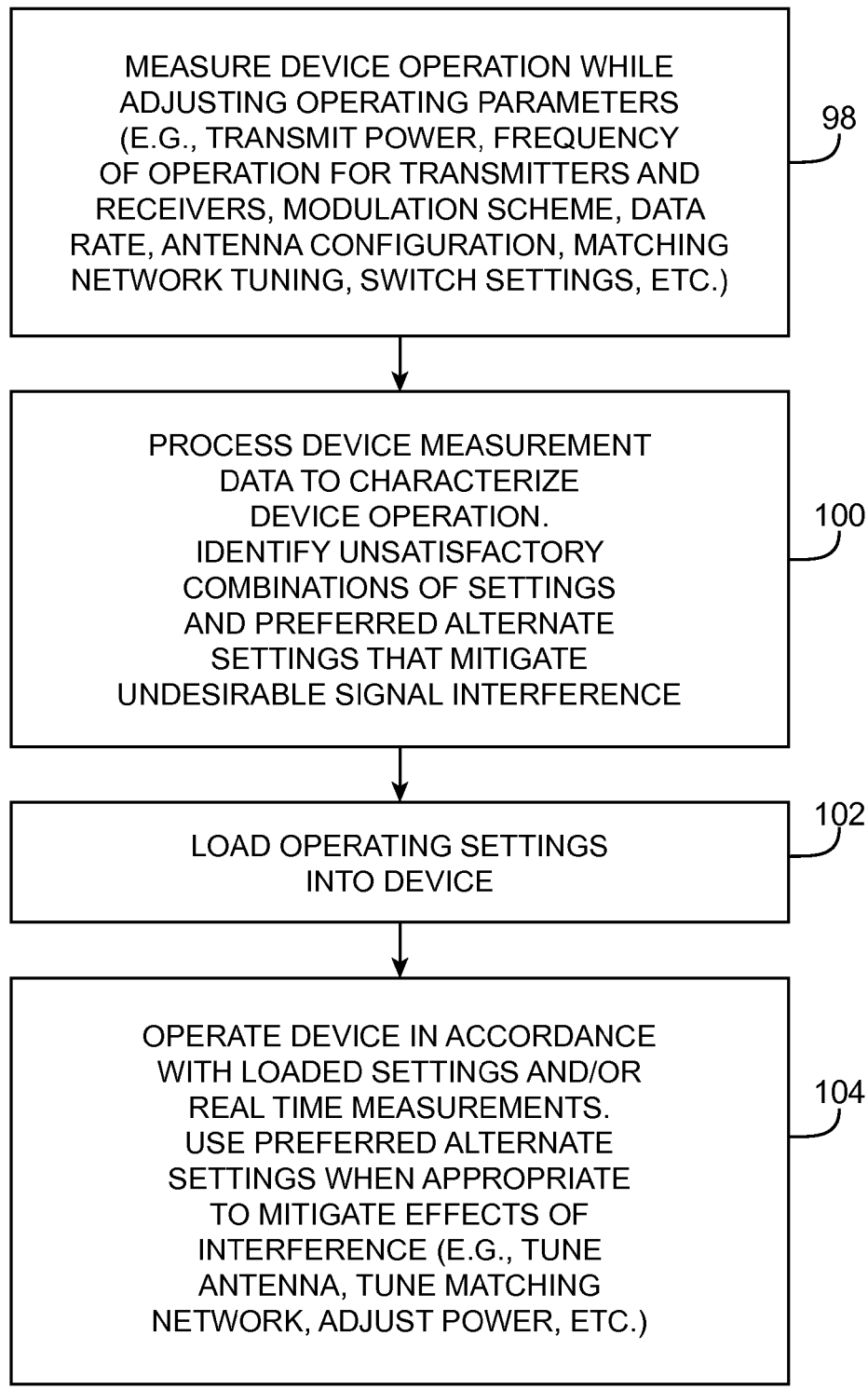
FIG. 11 is a flow chart of illustrative steps involved in operating an electronic device so as to mitigate the effects of interference in accordance with an embodiment of the present invention.

Illustrative steps involved in calibrating and operating devices 10 to mitigate the effects of interference are shown in FIG. 11. During the operations of step 98, device operations may be characterized. In a typical scenario, a test version of device 10 or a comparable evaluation board may be inserted into a test chamber. Test programs operating on the control circuitry of the device or operating on associated test equipment may direct the device to exercise a range of its capabilities. For example, the device may be directed to transmit and receive signals over all available combinations of communications bands, over a range of transmit powers, over a range of modulation schemes, over a range of antenna tuning settings and front end circuit settings, etc. Operations in which victims and aggressors are simultaneously active and in which victims and aggressors are not simultaneously active may be characterized. While adjusting the operating settings of the device, the device and associated test equipment may be used to monitor the impact of interference and other performance criteria. Performance data that may be gathered includes signal-to-noise ratio measurements, bit error rates, frame error rates, adjacent channel leakage, etc.

At step 100, the characterization measurements that were made during step 98 may be analyzed using computing equipment associated with or included in the test equipment used in making the test characterization measurements. Analysis results may reveal combinations of settings that produce unacceptably low levels of performance due to the effects of interference when aggressors and victims are simultaneously active. Analysis results may also reveal optimum settings to use when aggressors and victims are not simultaneously active (i.e., if only an aggressor or only a victim is active).

Analysis results may therefore be used to identify combinations of settings that achieve acceptable performance under a variety of settings. If, for example, it is desirable to transmit signals at frequency f1 while receiving signals at frequency f2, a set of acceptable settings (e.g., settings with a reduced maximum transmit power at frequency f1) can be identified that allow the device to function properly when both aggressor and victim are active. Efficiency-maximizing settings may also be identified to cover the situation in which the aggressor and victim are not simultaneously active. These settings may, for example, include a maximum transmit power for frequency f1 that is greater than the maximum transmit power at frequency f1 that is to be used when aggressor and victim are simultaneously active.

In some situations, adjustments may be made to accommodate simultaneous operation of aggressor and victim that change multiple parameters relative to the non-simultaneous scenario. For example, an alternative set of operating settings that avoids interference may include changes to both a data rate and a modulation scheme or to a tuning mode and a transmit power. Alternate settings for use during simultaneous aggressor and victim operation may include settings changes for one or more aggressors and one or more victims.

At step 102, devices 10 may be manufactured in a production environment and may be loaded with information on the alternative settings to use to mitigate the effects of interference. The settings for device 10 use may be located as part of a manufacturing process, during a software installation process (e.g., during a firmware update process in a factory or under user control in the field), or using a combination of these arrangements.

At step 104, device 10 may be operated in a system. For example, device 10 may interact with remote cellular telephone base stations, may receive satellite navigation signals, may communicate with accessories using Bluetooth® communications, and may communicate with wireless access points using WiFi® communications or other wireless local area network protocols. Other wireless activities may also be performed. The operation of device 10 may be controlled using software running on control circuitry 38. In some situations, the mode in which device 10 operates (including whether or not an aggressor and victim are in simultaneous use) is influenced by environmental factors (e.g., which cellular towers or local area network equipment is within range of device 10). The operating mode of device 10 may also be influenced by user input. For example, a wireless local area network transceiver might be activated in response to a user's command. The presence of incoming calls and messages may also affect which functions and transceiver circuits are needed by device 10. In response to these various factors and based on its preconfigured default settings (i.e., settings that include the optimum interference-mitigating settings and efficiency-maximizing settings identified during the operations of step 100), device 10 may efficiently transmit and receive wireless signals while mitigating the adverse effects of wireless interference whenever aggressors and victims are simultaneously active.

In some situations, only an aggressor may be active. When only the aggressor is active, the performance of the aggressor may be optimized (e.g., efficiency may be maximized) by using a first set of settings (e.g., the settings of rows such as rows R1, R3, R5, R7, and R9 of FIG. 10). When both the aggressor and one or more victims are active, the effects of interference may be mitigated by operating device 10 with interference-mitigating settings such as the settings of rows R2, R4, R6, R8, and R10 of FIG. 10). Control circuitry 38 can determine which transmitters and receivers are active by communicating with transceiver circuitry 30.

If desired, control circuitry 38 (e.g. baseband processor 40) may gather information on the wireless performance of device 10 in real time. Examples of performance criteria that may be measured by control circuitry 38 during operation of device 10 include C/No (carrier-to-noise power ratio), SINR (signal to interference-plus-noise ratio), Ec/Io (the ratio of the average power of a pilot channel to total signal power), signal-to-noise ratio, bit error rate, frame error rate, adjacent channel leakage, received signal power, etc. Information from these real time signal quality measurements may be used in determining which operating mode to use for device 10. For example, if the frame error rate of a received signal drops below a desired value when an aggressor and victim are simultaneously active, device 10 can conclude that wireless interference is causing a loss of signal and can therefore switch to using a different set of operating settings (e.g., by changing the frequency of transmission of the aggressor, by using a lower maximum transmit power setting to back off transmit power, etc.). Predetermined settings and real time feedback on signal quality may therefore be used together to select optimum settings for mitigating the effects of interference when aggressors and victims are simultaneously active while maximizing efficiency and other performance metrics whenever the aggressors and victims are not simultaneously active.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   antenna structures;
   wireless circuitry having transceiver circuitry that includes at least one aggressor and at least one victim;
   switching circuitry and a notch filter coupled between the antenna structures and the transceiver circuitry; and
   control circuitry that is configured to mitigate the effects of interference between the aggressor and the victim by using the switching circuitry to switch the notch filter into use in response to simultaneous activity of both the aggressor and the victim.

2. The electronic device defined in claim 1 wherein the wireless circuitry includes adjustable antenna structures and wherein the control circuitry is configured to adjust the adjustable antenna structures in response to determining that both the aggressor and victim are active.

3. The electronic device defined in claim 1 wherein the control circuitry is configured to adjust the switching circuitry to bypass the notch filter in response to determining that the aggressor and victim are not both active.

4. The electronic device defined in claim 1 wherein the aggressor comprises a radio-frequency transmitter with an adjustable data rate and wherein the control circuitry is configured to adjust the data rate in response to determining that both the aggressor and victim are active.

5. The electronic device defined in claim 1 wherein the aggressor comprises a radio-frequency transmitter with an adjustable modulation scheme and wherein the control circuitry is configured to adjust the modulation scheme in response to determining that both the aggressor and victim are active.

6. The electronic device defined in claim 1 wherein the control circuitry is configured to measure a wireless performance value selected from the group consisting of:
   carrier-to-noise power ratio, signal to interference-plus-noise ratio, a ratio of an average power of a pilot channel to total signal power, signal-to-noise ratio, bit error rate, frame error rate, adjacent channel leakage, and received power and is configured to adjust the wireless circuitry based on the measured wireless performance value.

7. The electronic device defined in claim 1, wherein the antenna structures comprise first and second antennas, the aggressor transmits signals over the first antenna, the victim receives signals over the second antenna, and the switching circuitry and the notch filter are coupled between the aggressor and the first antenna.

8. The electronic device defined in claim 1, wherein the antenna structures comprise first and second antennas, the aggressor transmits signals over the first antenna, the victim receives signals over the second antenna, and the switching circuitry and the notch filter are coupled between the victim and the second antenna.

* * * * *